United States Patent
Lou et al.

(10) Patent No.: US 7,292,560 B2
(45) Date of Patent: Nov. 6, 2007

(54) WIRELESS BROADBAND SERVICE

(75) Inventors: Yuang Lou, Norcross, GA (US);
Douglas Duet, Roswell, GA (US);
Vijay Perumbeti, Norcross, GA (US);
David Payne, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 346 days.

(21) Appl. No.: 10/879,477

(22) Filed: Jun. 29, 2004

(65) Prior Publication Data

US 2005/0030907 A1 Feb. 10, 2005

Related U.S. Application Data

(63) Continuation of application No. 09/418,986, filed on Oct. 14, 1999, now Pat. No. 6,778,517.

(51) Int. Cl.
*H04Q 7/20* (2006.01)
*H04L 12/56* (2006.01)

(52) U.S. Cl. .................. 370/338; 370/349; 370/395.52; 455/445

(58) Field of Classification Search ................ 370/338, 370/349, 395.52; 455/445
See application file for complete search history.

(56) References Cited

U.S. PATENT DOCUMENTS

| | | | |
|---|---|---|---|
| 5,479,447 A | 12/1995 | Chow et al. | 375/260 |
| 5,627,836 A | 5/1997 | Conoscenti et al. | 370/397 |
| 5,812,636 A | 9/1998 | Tseng et al. | 379/32 |
| 5,896,568 A | 4/1999 | Tseng et al. | 455/422 |
| 5,898,904 A * | 4/1999 | Wang | 340/7.27 |
| 6,016,311 A | 1/2000 | Gilbert et al. | 370/280 |
| 6,052,371 A | 4/2000 | Lemieux | 370/395 |

(Continued)

OTHER PUBLICATIONS

VDSL "System Requirements Document," ANSI Contribution TIEI.4/98-043R4, Sep. 1998.

(Continued)

*Primary Examiner*—Alpus H. Hsu
(74) *Attorney, Agent, or Firm*—Myers Bigel Sibley & Sajovec

(57) ABSTRACT

A fixed broadband wireless data access service providing shared wide-band packet-switched data transport for high speed data access in areas where conventional ADSL service and fiber optic service are unavailable. The wireless data access service is a point-to-multipoint cellular-type network that connects customers to data service providers through the ATM backbone of an existing network. Customers connect to the ATM backbone and data service provider through a cellular grid in which a wireless base station in each cell communicates with the individual customer wireless equipment within its cell site coverage area. The base stations are connected to an ATM backbone switch through wireless and wireline backhaul links. The upstream and downstream bandwidths of the wireless broadband network are engineered in various symmetric and asymmetric configurations to provide a shared packet-switched connection that emulates an uninterrupted, direct wireline ADSL connection. The wireless broadband network employs a data protocol of shared access bandwidth and adaptive asymmetric data rates to support multiuser service sessions by wireless transmission. The wireless broadband network is not network protocol specific and can be applied to wireless asymmetric digital subscriber line service, wireless integrated service digital network over digital subscriber line service, wireless very high bit rate digital subscriber line service, or wireless symmetric or single-line digital subscriber line service.

26 Claims, 4 Drawing Sheets

U.S. PATENT DOCUMENTS

| | | | |
|---|---|---|---|
| 6,205,143 B1 | 3/2001 | Lemieux | 370/395 |
| 6,212,387 B1 * | 4/2001 | McLaughlin et al. | 455/450 |
| 6,353,742 B1 * | 3/2002 | Bach | 455/453 |
| 6,356,537 B1 | 3/2002 | Jaakkola et al. | 370/310.2 |
| 6,381,232 B1 * | 4/2002 | Strawczynski et al. | 370/333 |
| 6,400,722 B1 * | 6/2002 | Chuah et al. | 370/401 |
| 6,407,997 B1 | 6/2002 | DeNap et al. | 370/352 |
| 6,904,024 B1 * | 6/2005 | Boch et al. | 370/310.1 |

OTHER PUBLICATIONS

Goralski, Walter, "Sonet: A guide to Synchronous Optical Networks," McGraw-Hill Companies, May 1997, Title Page, Table of Contents and Chapters 1, 4, 5 and 6.

Star, Cioffi and Silverman, "Understanding Digital Subscriber Line Technology," Prentice Hall 1999, ISBN 0-13-780545-4, Title Page, Table of Contents, and Chapters 1, 2, 11, 12, 14, and 15.

Goralski, Walter, "ADSL and DSL Technologies," McGraw-Hill Series on ComputerCommunications, 1998, ISBN 0-07-024679-3, Title Page, Table of Contents and Chapter 6, 7, 8 and 14.

ITU-T (International Telecommunications Union—Telecommunications) Recommendation M. 3010, "Principles for a Telecommunications Management Network," Oct. 1992.

"IETF Draft on Layer Two Tunneling Protocol," Oct. 1998.

Stallings, William, "ISDN and Broadband ISDN with Frame Relay and ATM," 4th edition, Prentice Hall, Inc., Oct. 1998, Chapters 1, 2, 5, 12, 14 and 16.

Sexton, Mike and Reid, Andy, "Broadband Networking: ATM, SDH and Sonet," Artech House, Jan. 199_, Chapters 2 and 3.

* cited by examiner

WIRELESS BROADBAND SERVICE

CROSS-REFERENCE TO RELATED APPLICATIONS

This application is a continuation of application Ser. No. 09/418,986, filed Oct. 14, 1999 (now U.S. Pat. No. 6,778, 517), entitled Wireless Broadband Service, assigned to the assignee of the present application, the disclosure of which is hereby incorporated herein by reference in its entirety as if set forth filly herein.

BACKGROUND

1. Field of the Invention

The present invention relates to the field of switched telephony, and in particular, to wireless digital subscriber services, such as asymmetric digital subscriber line (ADSL) services, that provide fixed broadband data access to remote locations.

2. Background of the Invention

As electronic communication by businesses and private individuals has increased, the demand on network service providers for high speed, i.e., broadband, data transmission has steadily grown. Originally, service providers attempted to meet such demand with narrow band analog modems over traditional circuit-switched communication networks. However, these networks unnecessarily consumed resources because they set aside direct lines for data transmission even when no voice or data was being transmitted. Thus, to utilize network resources more efficiently than the circuit-switched communication networks, service providers are increasingly turning to packet-switched communication and broadband data services.

Packet-switched communication utilizes network capacity only when transferring voice or data. Data is sliced into small packets of information that are transmitted when a circuit is available. Circuits are not dedicated to certain user applications, as a phone service would be in a circuit-switched network. Instead, circuits remain open and available to all on-line users whenever they have data packets to transmit. This allocation strategy keeps lines open and saves network resources until they are actually needed for communication.

To accomplish this packet-switched broadband data communication, traditional network service providers typically use one of the following deployment options: (1) ADSL service using wired landlines (wireline ADSL); (2) integrated fiber in the loop (IFITL); or (3) ISDN, X.25, and other similar deployment services. In the prior art, the network service providers that own these wired telephone lines prefer wireline ADSL to deliver packet-switched data communication in service areas highly concentrated with customers because existing wire lines can be used, making ADSL inexpensive relative to the customer revenue produced in concentrated areas. However, broadband data rates over wire line facilities are distance dependent and require digital carrier systems for support once the length of wire line facilities exceed three miles from the central office. In contrast, in less concentrated and remote areas (e.g., rural areas), the smaller number of potential customers typically does not offer enough revenue to outweigh the costs to install and maintain the system. In addition, the longer deployment distances require more engineering efforts and capital investment in the improvement of line qualification to achieve expected transmission efficiency and quality. Therefore, potential customers in many locations typically do not have access to wireline ADSL service.

IFITL deployment improves the efficiency and quality of transmission over greater distances as compared to the wireline ADSL. However, the cost of installing optical fiber lines is very high, such that the limited numbers of distant potential customers would rarely, if ever, justify the initial investment.

Thus, there remains a need for a supplemental service that extends existing packet-switch data networks to less populated and remote areas that currently have no access. The deployment technique should be economical to install and should not suffer from reduced transmission quality over long distances. Further, the deployment method should enable network service providers to furnish remote customers with data access, while still realizing a profit.

SUMMARY OF THE INVENTION

The present invention is a fixed broadband wireless data access service that provides broadband packet-switched data transport for high speed data access. It will be described herein in terms of ADSL, but it could be applied in other contexts, such as wireless integrated service digital network over digital subscriber line (IDSL), wireless very high bit rate digital subscriber line (VDSL), or wireless symmetric or single-line digital subscriber line (SDSL). The following publications describe the broadband data communications to which this invention can be applied and are hereby incorporated by reference: (1) Goralski, Walter, *SONET: A Guide to Synchronous Optical Networks*, McGraw-Hill Companies, May 1997; (2) Stallings, William, *ISDN and Broadband ISDN with Frame Relay and ATM*, $4^{th}$ Edition, Prentice Hall, Inc., October 1998; and (3) Sexton, Mike, and Reid, Andy, *Broadband Networking ATM, SDH, and SONET*, Artech House, January 1997. Additionally, the present invention will be described herein in terms of an asynchronous transfer mode (ATM) network protocol, but should be understood to apply to other packet-switched data protocols, such as Internet Protocol (IP) over the air.

Based on asynchronous transfer mode technology, wireless ADSL supplements an existing packet-switched data network to extend high speed data services to remote locations. The wireless ADSL network is a point-to-multi-point cellular-type network that connects to a data service provider (e.g., an internet service provider or corporate local access network) through an existing ATM regional broadband network (also referred to as a backbone network). The following publications describe the ADSL and ATM technology and are hereby incorporated by reference: (1) Goralski, Walter, *ADSL and DSL Technologies*, McGraw-Hill Series on Computer Communications, 1998, ISBN 0-07-024679-3; and (2) *ADSL Documents of ITU Standard*, T1E1.413. Also incorporated by reference, similar publications describing IDSL, VDSL, and SDSL are: (1) Starr, Cioffi, and Silverman, *Understanding Digital Subscriber Line Technology*, Prentice Hall 1999, ISBN 0137805454; (2) Roberts, R., *VDSL Out-of-Band Spectral Roll-off: FCC Part 15 Compliance Based Upon Flat-Pair Distribution-Cable Radiation*, ANSI T1E1.4/97-244, Minneapolis, Minn., September 1997; and (3) Cioffi, John, *VDSL System Requirements Document*, ANSI Contribution T1E1.4/98-043R3, June 1998. In addition, U.S. Pat. No. 5,479,447, issued Dec. 26, 1995 to Chow et al., discloses a method and apparatus for adaptive, variable-bandwidth, high speed data transmission of a multicarrier signal over digital subscriber lines, and is hereby incorporated by reference.

To support multiuser service sessions by wireless transmission, the present invention employs a data protocol of shared access bandwidth with adaptive asymmetric data rates. The strategy of sharing bandwidth by time allows several customers to simultaneously interface with a wireless transmitter/receiver connected to the ATM backbone. Additionally, adaptive asymmetric data rate protocols optimize the communication between the multiple customers and the wireless transmitter/receiver. The asymmetric data rate protocol tailors the data streams between the customer and wireless transmitter/receiver to accommodate changes in the amount of data that must be transmitted. Communication travels back and forth between the customer equipment and the wireless transmitter/receiver such that one side transmits data and then listens for transmissions by the other side. As a result, the wireless data protocol of the present invention fully integrates the wireless multiuser high speed data access service with the wireline regional broadband network and the connected data service providers.

As shown in FIG. 1, the present invention builds upon the ATM switch of an existing regional broadband network. Base stations located nearest to the ATM switch are connected through wireline or wireless backhaul links to the ATM switch (FIG. 1 shows wireline backhaul links, but wireless backhaul links could also be used). A base station includes "trans/ceiver radio", "RF channel combiner", and/or any kind of filters. Backhaul links are the transmission facilities, like transport trunks carrying concentrated user data and network signaling, that support the duplex communications between customer ends and a central location such as a switch or service provider's network. Each base station, consisting of wireless transmission equipment, is centrally located in a network cell to provide shared high speed wireless access to each customer covered by the same transmitter/receiver antenna at the cell hub. The customers within the cells each have wireless customer equipment for communicating with the base station equipment. The base stations are connected to the nearest ATM switch through backhaul links that can be radio-frequency (RF) backhaul links, land line backhaul links, or a combination of the two. Cells are linked together on backhaul facilities to the ATM switch. The layers of linked cells produce a network of integrated broadband data service that uses wireless technology to deliver high speed data access to previously unreachable areas.

Also connected to the ATM switch is a network management system (NMS) that provides a network view of all its managed elements. The NMS controls and monitors the end-to-end operations of the wireless ADSL network, such operations including network creation, flow-through provisioning, fault and performance management, capacity and traffic management, accounting management, and security management.

The present invention uses a data management strategy that provides customers with seamless data transfer. Although customers within a cell share packet-switched data connections over the air, the wireless ADSL network provides each customer with an individual permanent virtual connection that provides continuous high speed data access. In the preferred embodiment, the present invention supports a wide range of packet-switched data services, e.g., internet access, on-line web browsing, wireless VoIP (voice over internet protocol), wireless voice service, interactive video services, nomadic wireless data access, and broadband mobile data access.

To provide uninterrupted service, the downstream bandwidth from the network to the customer or the upstream bandwidth from the customer to the network can be engineered in various symmetric and asymmetric configurations. In the preferred embodiment, the particular data traffic management configuration is tailored to meet the needs of individual customers. The base stations communicate with customer radio equipment that links to an Ethernet or ATM interface on the customer's network, depending on the interface required by the customer's network model. The customer radios in each cell share the same down-link wireless data channel, and send user traffic data back to the base station. The mode of transmission from a base station to customer radios is point-to-multipoint, while the mode of transmission from an individual customer radio to a base station is point-to-point.

Accordingly, it is an object of the present invention to provide economic high speed data access to customers in locations where wireline ADSL and IFITL service is not available.

It is another object of the present invention to provide a wide range of packet-switched data services to multiple consumers using shared wireless packet-switched data connections.

These and other objects of the present invention are described in greater detail in the detailed description of the invention, the appended drawings, and the attached claims.

DETAILED DESCRIPTION OF THE INVENTION

Figure 1:
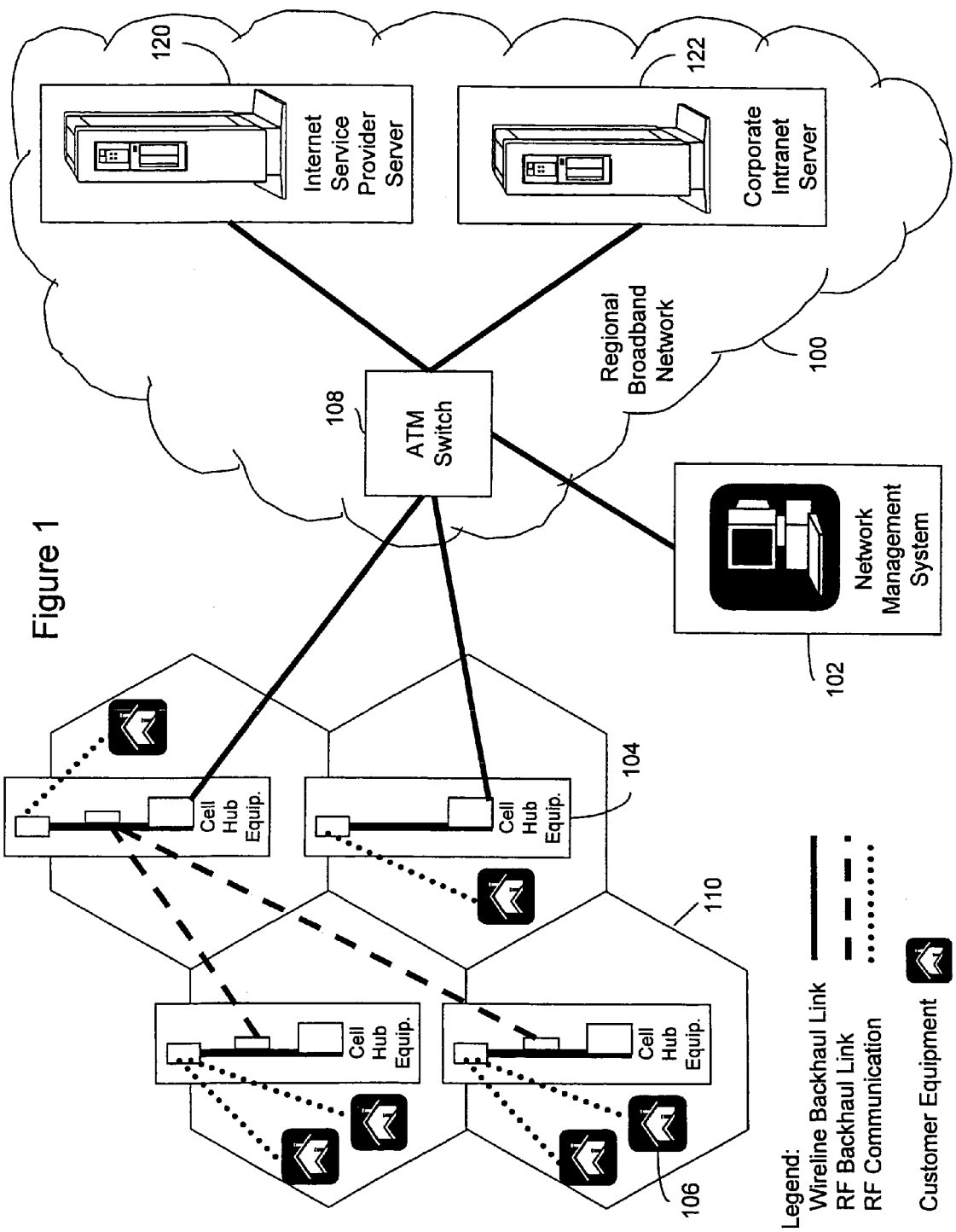
FIG. 1 is a schematic diagram of the wireless ADSL network.

Referring to FIG. 1, the present invention comprises four primary components: a regional broadband network 100, a network management system 102, cell hub equipment 104, and customer equipment 106. Regional broadband network 100 is an existing packet-switched communications network that interfaces with data service providers, e.g., an internet service provider server 120 or a corporate intranet server 122. Through an ATM switch 108, regional broadband network 100 connects to NMS 102. NMS 102 monitors and controls all network communications. Also through ATM switch 108, regional broadband network 100 connects to cell hub equipment 104 through either wired landlines or wireless links. Cell hub equipment 104 is distributed throughout a service region in a grid pattern, in which each set of cell hub equipment services a cell site coverage area 110. Cell hub equipment 104 at each cell site location consists of one or more base stations that communicate directly with individual customer equipment 106 located within the cell site coverage area 110. Both cell hub equipment 104 and customer equipment 106 comprise radio-frequency transmitters and receivers. Customer equipment 106 also includes links to local area networks and data terminals, such as personal computers.

Communication through the wireless ADSL network originates at the regional broadband network 100 and traverses the following path: from regional broadband network 100 to ATM switch 108, from ATM switch 108 to cell hub equipment 104, and from cell hub equipment 104 to customer equipment 106. Within customer equipment 106, communication terminates at a personal computer inside the customer premises (and, in the case of multiple users within one customer premises, flows through a local area network before terminating at the individual computers). Data flows from end to end in both directions along this communication path. Additionally, although the described path includes only one layer of cell sites, it would be apparent to one skilled in the art that multiple layers of cell hub equipment may exist by which cell sites can be linked such that the data from a distant cell site may travel from cell hub equipment to cell hub equipment before reaching ATM switch 108 and regional broadband network 100. An example of this multiple layer communication is shown schematically in FIG. 1.

To properly integrate the wireless data transfer with the existing wireline ADSL network, the present invention incorporates a data protocol that splits bandwidth among individual customer equipment 106 in a cell and varies the data rates between customer equipment 106 and cell hub equipment 104. To provide simultaneous access to several users, the bandwidth is divided such that one side transmits and listens for transmission from the other side. The bandwidth sharing is accomplished by one of several technologies used to distinguish multiple accesses over a finite frequency spectrum, e.g., Time Division Multiplex, Time Division Multiple Access, Frequency Division Multiple Access, or Code Division Multiple Access.

The transmitted data rate is asymmetric and adaptive such that the ratio of the upstream and downstream data rate is dynamically updated. Unlike wireline ADSL, the wireless ADSL adjusts data rates to accommodate varying amounts of traffic data on demand. Software provisioned on cell hub equipment 104 automatically controls data traffic between cell hub equipment 104 and customer equipment 106, selecting data rates suitable for the traffic demand and the capacity of the cell hub equipment 104. Controlling the data rate improves the capacity utilization between the wireless portion and existing wireline portion of the present invention.

The data protocol facilitates shared packet-switched communication over the air. The typical number of customer equipment 106 serviced by a single station of cell hub equipment 104 depends on the radio coverage, number of sectored radios, and the bandwidth capacity of each sectored radio for the transmitter/receiver at the single station of cell hub equipment 104. For radio coverage, the higher the antenna is positioned with the higher the power supplied by cell hub equipment 104 and the higher the density of customer equipment 106, the larger the possible number of connected customer equipment 106. For bandwidth capacity, the total number of customers within radio coverage depends on the minimum data bandwidth guaranteed to each customer, e.g., if 20 Mbps have been allocated for a cell site with 20 customers, a service provider can guarantee 1 Mbps to each customer (the service provider could also increase the number of customers by factoring in the minimum number of nonusers at any given time and adding that number to the total number of serviceable customers).

System Components

Turning to the individual components of the wireless ADSL networks, the following sections describe the specific structure of the network components:

Regional Broadband Network

Regional broadband network 100 consists of high-bit-rate backhaul transport facilities and an existing ATM data network. These two elements interface cell sites to individual networks of network service providers. The high-bit-rate backhaul facilities connect the wireless ADSL base stations to ATM switch 108 in the ATM data network. In the preferred embodiment, the backhaul facilities are either DS-3 or OC-3 lines and are traffic engineered to implement service level agreements to meet the needs of the customers. The service level agreements describe selected parameter sets, which form different classes of services. For example, reserved data bandwidth is one of the key parameters in the agreements. The term "traffic engineering" refers to the method of dimensioning telecommunications equipment to provide service to customers at a defined quality of service.

As part of regional broadband network 100, the existing ATM data network is an interconnection broadband packet data network. An interconnection broadband packet-data network is a set of provisioned high speed data transmission facilities between networks or systems. In the preferred embodiment of the present invention, the ATM data network comprises Carrier Class ATM switches that deliver broadband services to both residential and small business customers.

Network Management System

Network management system (NMS) 102 is connected to ATM switch 108 of regional broadband network 100. NMS 102 is a comprehensive system for monitoring, controlling, and managing the data communication from regional broadband network 100 to customer equipment 106 via cell hub equipment 104. Providing end-to-end and uniform operation support capabilities, NMS 102 enables network creation, flow-through provisioning, fault collection and correlation, capacity and traffic management, performance management, and accounting and security management.

Figure 2:
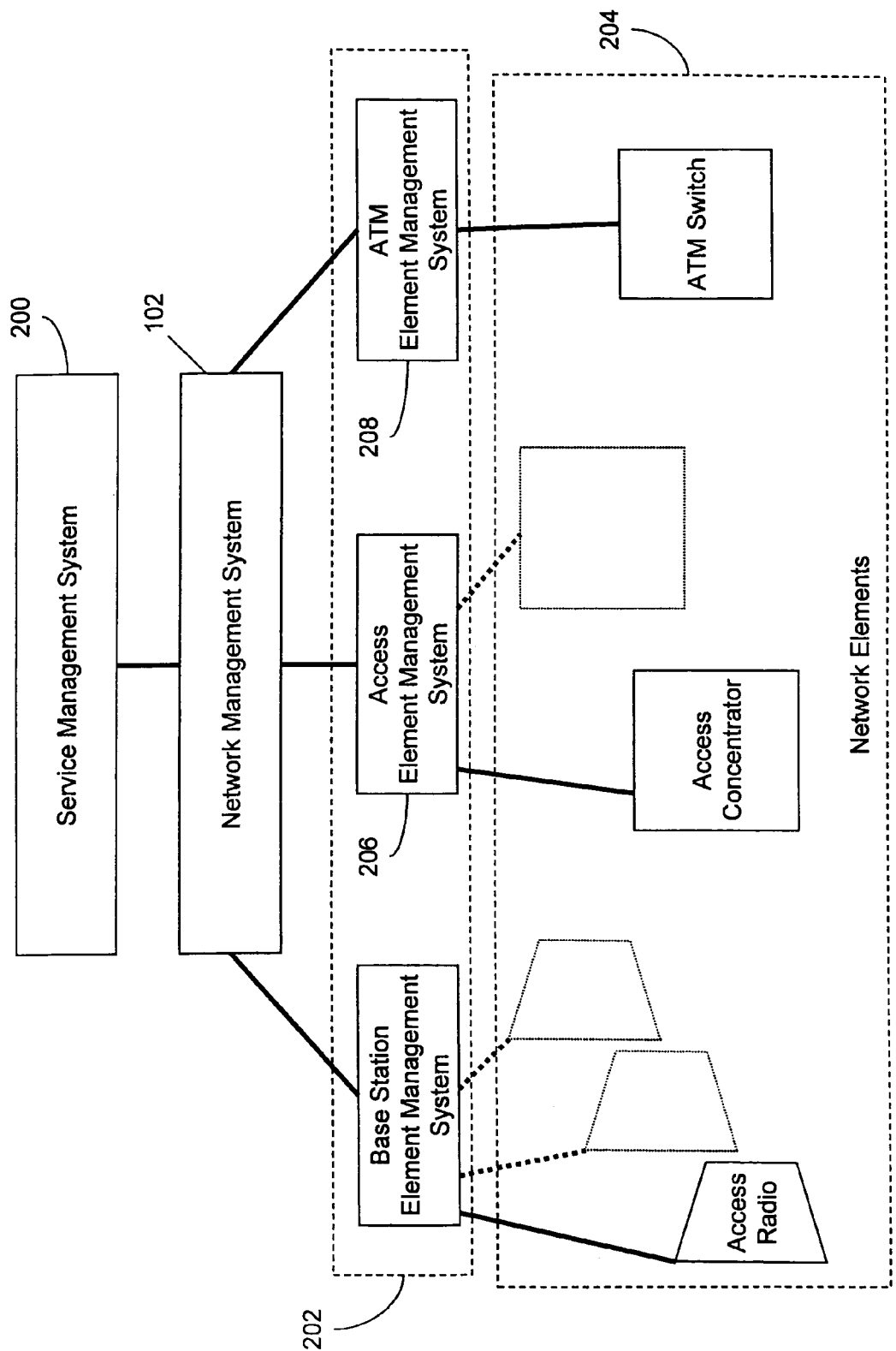
FIG. 2 is a schematic diagram of the service and network management systems of the wireless ADSL network.

In a preferred embodiment of the present invention, NMS 102 uses a Telecommunications Management Network (TMN) layered architecture to invoke Operation Support Systems, i.e., methods and procedures that directly support the daily operation of the network infrastructure. The following publication describes the TMN architecture and is hereby incorporated by reference: *ITU-T (International Telecommunications Union-Telecommunications) Recommendation M.3010*, "Principles for a Telecommunications Management Network," October 1992. As shown in FIG. 2, NMS 102 operates as part of a service management system 200 that facilitates the provisioning and administration of service data. NMS 102 oversees all element management systems (EMSs) 202. The EMSs 202 manage all related network elements 204 and interact with NMS 102 through a negotiated interface. In the preferred embodiment, the negotiated interface is a Common Object Request Broker Architecture (CORBA) based interface. The interface is proposed in wireless ADSL, and is the same interface that is implemented in the conventional wireline ADSL. A preferable network layout of Access EMS 206 and ATM EMS 208 is shown in FIG. 2.

In the preferred embodiment, an individual EMS provides several high level functions within NMS 102. First, the EMS furnishes to NMS 102 all related information required for NMS 102 to accomplish the end-to-end operations described above. Second, the EMS is configured to receive and terminate NMS messages, i.e., the NMS/EMS interface must not be a "pass-through" interface. Thus, in response to NMS messages targeted and terminated at the EMS, the EMS takes appropriate action and reports back to NMS 102. The EMS manages detailed information from each Network Element within its domain and sends only appropriate information to NMS 102 as a part of the negotiated interface. Further, the EMS manages its respective Network Elements on a subnetwork basis (as defined in the context of the M4 Model in the ATM Forum), i.e., the EMS has the ability to manage a subgroup of network elements as if the network elements were one network element.

The individual elements of network elements 204 are defined as follows. Access radio is the radio at the based station, which is a radio frequency transmitter/receiver that communicates with consumer radios. In general, access radios are sectored radios (an Omni access radio is a special case). Access radios give customer access to the broadband network data pipe (trunk). In the reverse direction, the access concentrator distributes the data traffic among proper access radios that relay the data to consumer ends.

A third high level function of the EMS is the support of transmission of the auto-discovered network element information from the EMS domain to NMS 102, e.g., new cards in the base station equipment. The auto-discovered (AD) function automatically detects any element under the control of the EMS that is newly configured and/or newly out of service, reports the existence of the new element, and updates its database to monitor and control the new equipment and configuration.

As a final high level function, the EMS provides a graphical user interface at the EMS level to manage the installation of network elements. The graphical user interface is preferably a web graphical user interface.

Cell Hub Equipment

Cell hub equipment 104 is located at one base station, which is connected to an omni-directional antenna or a set of sectored antenna(s) centrally located in a cell site. The antenna(s) is/are positioned on top of a pole, tree, tower, or other tall structure of height ranging from 25-150 feet, depending on whether microcells or macrocells are deployed. However, for access by mobile customers, macrocells should be considered. Preferably, the service area of each cell covers ⅓ to 3 miles in radius.

The base station antennas in each cell communicate with customer units by wireless transmission. Preferably, transmission power is high enough to provide adequate service coverage for all customers in the cell, within compliance with FCC regulations. Further, the transmission is digital, using programmable multilevel radio-frequency (RF) modulation schemes. Because of the asymmetric nature of ADSL traffic, the RF channel duplex method is preferably time division duplex; however, frequency division duplex is an acceptable alternative. Also, because of the asymmetric nature of ADSL traffic, the channel access method is preferably time division multiple access; however, code division multiple access is also possible.

Cell hub equipment 104 also includes connection management equipment and packet-switching equipment. The connection management equipment manages both the base stations and the backhaul connections and is responsible for: (1) customer equipment authentication (determining if customer is an approved subscriber); (2) configuration and control of customer equipment, base station, and backhaul communication; and (3) remote ATM signaling support. The packet-switching equipment aggregates traffic from individual base station antennas to the high speed data backhaul facility and distributes the traffic in the reverse direction.

Customer Equipment

To complete the delivery of high speed data access to the customer, customer equipment 106 is installed at businesses or residences to communicate with the wireless cell hub equipment 104. As the final part of the communication path, customer equipment 106 comprises an outside wireless transmitter/receiver radio, wire cabling from the wireless transmitter/receiver radio to inside the customer premises, a network interface card connected to the cabling, and a personal computer connected to the network interface card. (If there are multiple computers within a single customer premises, the cabling connects to a local area network and each computer has a separate network interface card.) The wireless transmitter/receiver radio is preferably installed at a fixed location on the roof or side of a customer's premises at a height sufficient for line-of-sight transmission to cell hub equipment 104. The cabling joins the wireless transmitter/receiver radio to the local area network or individual personal computer within the customer's premises by an appropriate connection, e.g., 10Base-T, 100Base-T, or ATM25. At each personal computer, a network interface card, e.g., an Ethernet or ATM network interface card, is installed. The network interface card attaches to either a local area network communications device (e.g., a hub) or directly to the wireless transmitter/receiver radio.

The wireless connection and transport from customer equipment 106 to cell hub equipment 104 employs ATM packet-switching technology and is shared by multiple users covered by the same wireless transmitter/receiver radio installed at base station of cell hub equipment 104. For a local area network that supports multiple personal computers, multi-user traffic from the local access network shares the customer equipment's total access capacity. Within the coverage of a single base station, multi-user traffic data from many customers' equipment share the total bandwidth of a RF channel. The RF transmission from customer equipment 106 supports communications with the base stations of cell hub equipment 104. The total radio bandwidth of the RF channel is managed by connection management equipment in cell hub equipment 104.

Communication Protocol

Figure 3:
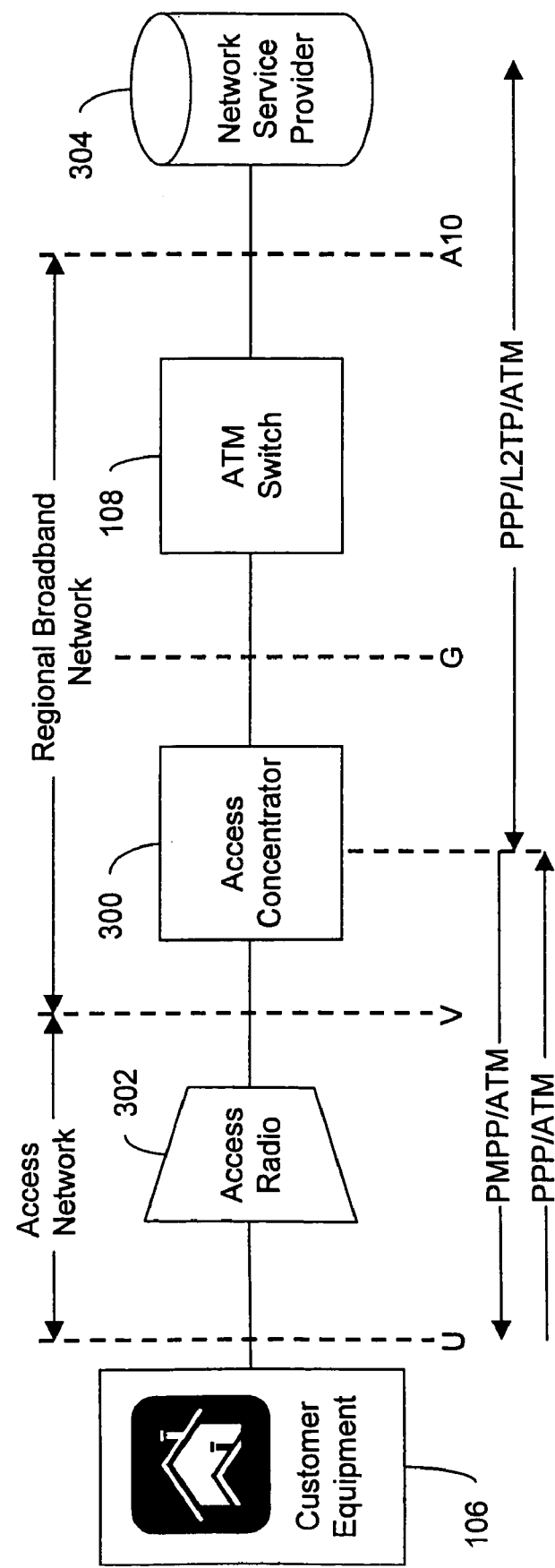
FIG. 3 is a schematic diagram of the wireless ADSL data network architecture.

The system components described above form a wireless ADSL data network architecture as shown in FIG. 3 that provides a high speed wireless data interface for delivering differentiated broadband data services to customers via a local area network infrastructure. The wireless ADSL system uses the RF spectrum for wireless transmission, and in the preferred embodiment, uses the most easily accessible spectrum bands, e.g., unlicensed bands such as the Industrial, Scientific, and Medical bands and the National Information Infrastructure band. Alternatively, the wireless ADSL network could use licensed bands such as the Wireless Communications Services band and the Multi-channel Multipoint Distribution Service band.

The communication protocol used in the access network and regional broadband network portions of the wireless ADSL data service architecture is shown in FIG. 3. In a preferred embodiment, Point-to-Multipoint Protocol (PMPP)/ATM protocol is used as the transport protocol for data services across the U interface into the customer premises, and Point-to-Point Protocol (PPP)/ATM protocol is used as the transport protocol for data services from the customer premises to the access concentrator 300. These transport protocols preserve the network interfaces and functions seen by customers when accessing remote applications and Radius services. Radius services are remote authentication dial-in user services that include authentication of users and accounting for billing purposes. The following publication describes Radius services and is hereby incorporated by reference: *IETF Draft on Layer Two Tunneling Protocol "L2TP"*, October 1998. Thus, a user perceives that he or she is directly linked to a network service provider, although in reality the user is sharing packet-switched data access over a distributed network.

Within regional broadband network 100, but before ATM switch 108, an access concentrator 300 aggregates all of the regional customer data traffic into one "tunnel" and aggregates the Layer 2 Access Concentrator (LAC) over one Permanent Virtual Circuit (PVC). The regional customer data traffic originates from multiple sets of customer equipment 106 and flows through cell hub equipment (represented in FIG. 3 as access radio 302) to access concentrator 300. After access concentrator 300, the aggregated data is then transported through the ATM switch 108 to the network service provider network 304. Although in FIG. 3 PPP/L2TP/ATM is shown as the transport protocol at G, a different protocol may be used, depending on the needs of the network service provider equipment and business interface. It is important to note that the access concentrator 300 at V aggregates services from many different access technologies into one or more physical and/or logical interfaces. Thus, for example, wireline ADSL, dial-up, and T-1 could all be aggregated into the same interface at the access concentrator 300. However, the preferred embodiment of the protocol stack for current and future access technologies is PPP/ATM. PPP/ATM is preferred because of its current availability and because its use preserves the network interfaces and functions seen by the user. Using PPP protocol hides from the user the fact that a distributed network is being used to connect to the service provider. With the PPP protocol, the user perceives a single network connection rather than a collection of independent physical links.

Figure 4A:
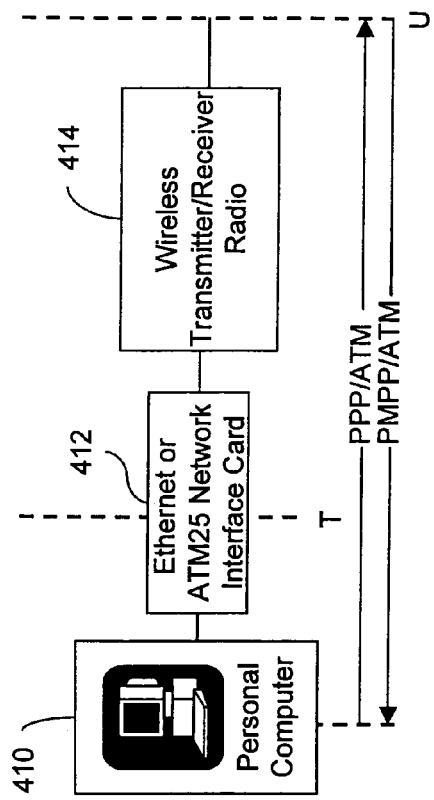
FIG. 4a is a schematic diagram of a customer premise network architecture for a customer with a single personal computer.

As shown in FIG. 4a, at the customer premises, the communication protocol maps point-to-point sessions from a customer's personal computer 410 to the wireless transmitter/receiver radio 414. The preferred embodiment of the present invention uses PPP/ATM protocol within the customer network to conform to typical industry practice. For customers with single personal computers, an ATM25 network interface card 412 would be used to connect to wireless transmitter/receiver radio 414. For customers with multiple devices within the customer network, a small ATM switch/router is inserted between personal computer 410 and wireless transmitter/receiver radio 414.

Figure 4B:
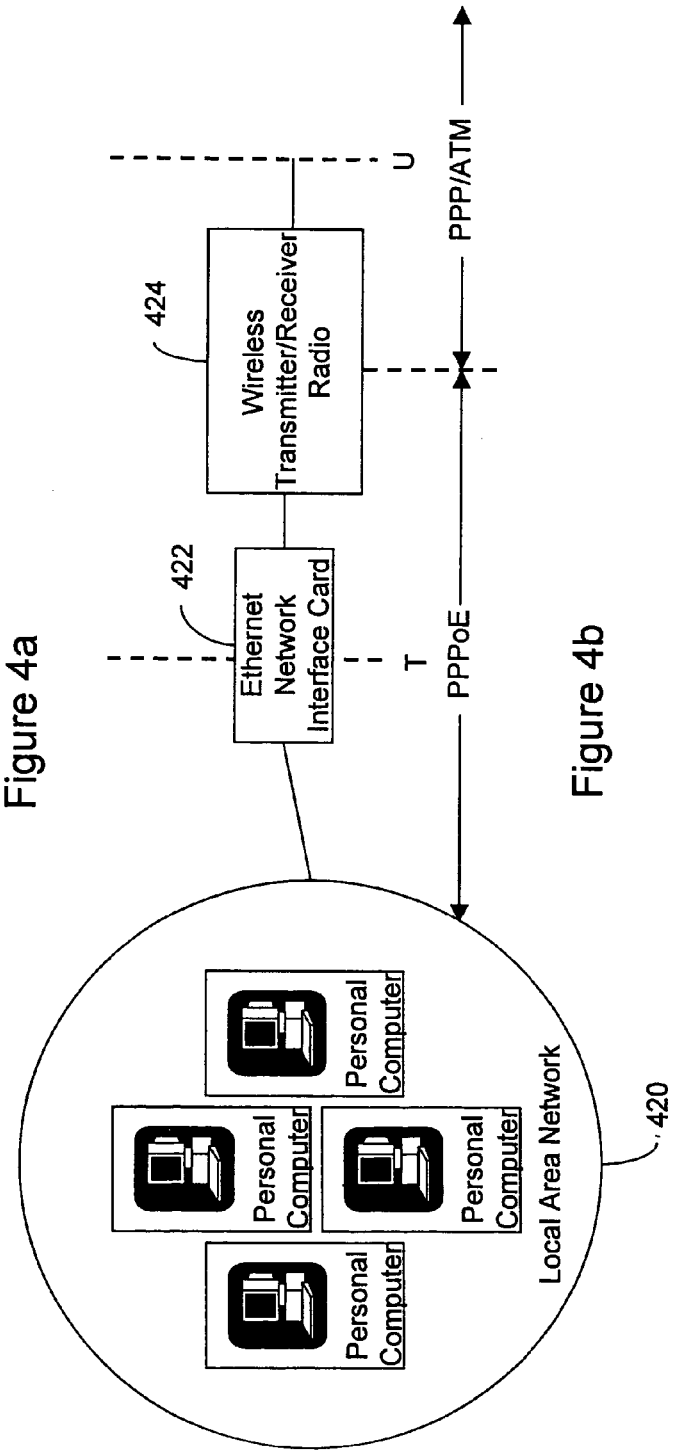
FIG. 4b is a schematic diagram of a local area network (LAN) architecture in a customer premise.

In the case of traditional Ethernet local area networks, alternative networking technology is employed to map point-to-point sessions from a customer's personal computer to the wireless transmitter/receiver radio. An example of this alternative architecture is shown in FIG. 4b. The architecture uses point-to-point protocol over the Ethernet in a communication from a local area network 420. In each personal computer, one Ethernet card is installed. The data traffic from an individual personal computer through its Ethernet network interface card 422 is aggregated at the Ethernet network interface card 422 and forwarded to a wireless transmitter/receiver radio 424.

The communication protocols described above enable the present invention to emulate wireline ADSL as perceived by the customer. Specifically, the communication protocols create several aspects of network transparency, as a result of which the customer perceives that she has a direct connection with the network service provider, rather than a shared packet-switched connection. The individual aspects of this network transparency are as follows:

1) Access Transparency: The wireless ADSL network protocol supports multiple, independent, and simultaneous point-to-point sessions between customer personal computers on customer premises' local area networks and network service providers. Further, the network's point-to-point transport is not impaired among multiple layer-3 protocols.

2) Class-of-Service Transparency: The data service architecture supports independent classes of service for each user session, which enables local area network users at customer premises to subscribe to a differentiated grade of service from service providers. Further, the data service architecture supports a mechanism of Quality of Service mapping between point-to-point session and ATM virtual channels.

3) Address Transparency: Specifically, the data service architecture enables customer premise local area network users to access service providers by using either a registered or private network address by traditional or virtual dial-up.

4) Scaling Transparency: Using the communication protocol, the data service architecture does not significantly limit the number of customer lines in the access network nor limit the number of concurrent point-to-point sessions established to any one network service provider.

5) Authentication, Authorization, and Accounting: Specifically, the data service architecture preserves the authentication, authorization, and accounting functions of each point-to-point session.

6) Incoming Calls: Data architecture does not preclude the support of incoming calls for either point-to-point sessions or ATM Switched Virtual Connections.

Advantages

The present invention offers several advantages in extending ADSL service to remote locations. Because the deployment strategy builds upon an existing regional broadband network, it is not necessary to invest large sums of money in developing a regional broadband network. In addition, existing regional broadband networks may not be fully loaded, such that the addition of the wireless ADSL service fully utilizes network resources.

Another advantage of the present invention is the ability to run IP protocol at the customer premises while running ATM protocol over the air and over the backbone network. This allows the customers to use the IP local area network interface cards that they already have, instead of having to purchase additional ATM interface cards.

The network architecture of the present invention will also support many different future vertical packet-switched data services, including wireless voice over internet protocol (VoIP), wireless voice telecommunications over ATM (VToA), packet-switched data return path for interactive TV or video, nomadic data access through wireless transmission, and broadband mobile data access.

Another advantage of the present invention is its ability to transmit over long distances without reduced transmission quality. In wireless ADSL, loop qualification is unnecessary and the absence of hard connections (e.g., bridge taps) keeps transmission quality high.

Finally, the network strategy of the present invention offers a significant advantage in its breadth of application. In particular, the network architecture and protocols are not limited to specific vendors, services, radio spectrums, network protocols, or wireless access technologies.

With regard to network protocols, the preferred embodiment describes an ATM implementation for purposes of illustration and should not be construed to be limited to the ATM network protocol. Rather, it should be noted that the implementation of wireless ADSL is not network protocol specific and that the preferred embodiment is compatible with other wireless ADSL implementations based on packet-switched data protocol such as Internet Protocol (IP) over the air. The ATM network protocol was chosen to illustrate the preferred embodiment simply because of the current availability of existing ATM backbone networks and the high level of familiarity those skilled in the art hold for the current ATM networks.

With regard to wireless access technologies, the preferred embodiment describes a wireless ADSL service for the purpose of illustration and should not be construed to be limited to wireless ADSL. The disclosed architecture could also be applied to wireless integrated service digital network over digital subscriber line (IDSL), to wireless very high bit rate digital subscriber line (VDSL), or to wireless symmetric or single-line digital subscriber line (SDSL).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A cellular base station, comprising:
   at least one antenna;
   a wireless transmitter/receiver coupled to the at least one antenna that is configured to provide wireless broadband service between the base station and a plurality of customer equipments;
   an interface to a backhaul communications link to a broadband network; and
   a packet-switching equipment that is configured to aggregate data traffic received from the plurality of customer equipments via the at least one antenna and the wireless transmitter/receiver and that is further configured to distribute data traffic received from the broadband network via the interface to the backhaul communications link.

2. The cellular base station of claim 1, wherein a point-to-point asynchronous transfer mode protocol governs a communication from one of the plurality of customer equipments to the wireless transmitter/receiver and a point-to-multipoint asynchronous transfer mode protocol governs a communication from the wireless transmitter/receiver to the plurality of customer equipments.

3. The cellular base station of claim 1, further comprising connection management equipment that is configured to authenticate the plurality of customer equipments.

4. The cellular base station of claim 3, wherein the connection management equipment is further configured to at least partially control the plurality of customer equipments.

5. The cellular base station of claim 3, wherein the wireless broadband service comprises video service.

6. The cellular base station of claim 3, wherein the wireless broadband service comprises VoIP service.

7. The cellular base station of claim 1, wherein the packet switching equipment is further configured to provide the aggregated data traffic to the interface to the backhaul communications link for transmission to an asynchronous transfer mode switch in the broadband network.

8. The cellular base station of claim 1, wherein the wireless transmitter/receiver comprises a radio-frequency wireless transmitter/receiver.

9. The cellular base station of claim 1, wherein each of the plurality of customer equipments comprises a customer radio.

10. The cellular base station of claim 9, wherein at least some of the plurality of customer equipments further comprises a personal computer that is linked to a respective one of the customer radios.

11. A cellular base station, comprising:
    at least one antenna;
    a wireless transmitter/receiver coupled to the at least one antenna that is configured to provide wireless broadband service between the base station and a plurality of customer equipments;
    an interface to a backhaul communications link to a broadband network; and
    a packet-switching equipment that is configured to aggregate data traffic received from the plurality of customer equipments via the at least one antenna and the wireless transmitter/receiver and that is further configured to distribute data traffic received from the broadband network via the interface to the backhaul communications link;
    wherein the wireless transmitter/receiver is further configured to provide a wireless communications link between the cellular base station and a secondary cellular base station.

12. The cellular base station of claim 11, further comprising software and/or hardware that is configured to dynamically adjust the data rates on the wireless communications links between the base station and the plurality of customer equipments.

13. The cellular base station of claim 12, wherein the software and/or hardware is configured to dynamically adjust the data rates on the wireless communications links between the base station and one of the plurality of customer equipments based at least in part on a grade of subscription service associated with the one of the plurality of customer equipments.

14. The cellular base station of claim 11, wherein the channel access method of the wireless broadband service is a time division multiple access channel access method.

15. A method of providing broadband data service to a plurality of customer computers via a cellular base station, the method comprising:
    receiving a plurality of packet-switched data packets at the cellular base station from a broadband network via a backhaul communications link;
    distributing the plurality of packet-switched data packets for transmission to selected of the plurality of customer computers and to at least one secondary cellular base station; and
    transmitting the distributed packet-switched data packets to the selected of the plurality of customer computers and to the secondary cellular base station via a plurality of wireless communications links;
    wherein the wireless communication links with the plurality of customer computers and the at least one secondary cellular base station use shared packet-switched data transport with a shared access bandwidth with adaptive asymmetric data rates.

16. The method of claim 15, wherein the distributed packet-switched data packets are transmitted to the selected of the plurality of customer computers and to the secondary cellular base station using an asynchronous transfer mode protocol.

17. The method of claim 15, the method further comprising at least partially controlling the plurality of customer computers.

18. The method of claim 15, wherein the broadband data service comprises asymmetric digital subscriber line service.

19. The method of claim 18, wherein the cellular base station is part of a point-to-multi-point cellular type network.

20. The method of claim 15, the method further comprising splitting an available bandwidth between the cellular base station and the plurality of customer computers based at least in part on an amount of data requested by each of the plurality of customer computers.

21. The method of claim 20, the method further comprising splitting the available bandwidth between the cellular base station and the plurality of customer computers based also on a subscription service level associated with at least some of the customer computers.

22. A method of providing broadband data service to a plurality of customer computers via a cellular base station, the method comprising:
- receiving a plurality of packet-switched data packets at the cellular base station from a broadband network via a backhaul communications link;
- distributing the plurality of packet-switched data packets for transmission to selected of the plurality of customer computers and to at least one secondary cellular base station; and
- transmitting the distributed packet-switched data packets to the selected of the plurality of customer computers and to the secondary cellular base station via a plurality of wireless communications links;
- wherein the data rates at which the distributed packet-switched data packets are transmitted to the selected of the plurality of customer computers and to the secondary cellular base station are adaptively varied; and
- wherein the data rates at which the distributed packet-switched data packets are transmitted to the selected of the plurality of customer computers are selected at least in part based on one or more grades of service subscriptions.

23. The method of claim 22, wherein the one or more grades of service subscriptions are associated with applications that are sending data to at least some of the selected of the plurality of customer computers.

24. The method of claim 22, wherein the one or more grades of service subscription are associated with customers that are associated with at least some of the selected of the plurality of customer computers.

25. A method of providing broadband data service to a plurality of customer computers via a cellular base station, the method comprising:
- receiving a plurality of packet-switched data packets at the cellular base station from a broadband network via a backhaul communications link;
- distributing the plurality of packet-switched data packets for transmission to selected of the plurality of customer computers and to at least one secondary cellular base station; and
- transmitting the distributed packet-switched data packets to the selected of the plurality of customer computers and to the secondary cellular base station via a plurality of wireless communications links;
- receiving a first plurality of packet-switched data packets at the cellular base station from a first customer computer and receiving a second plurality of packet-switched data packets at the cellular base station from a second customer computer;
- aggregating the first and second plurality of packet-switched data packets; and
- transmitting the aggregated packet-switched data packets to a switch in the broadband network.

26. The method of claim 25, the method further comprising authenticating the first customer computer and the second customer computer to confirm the first customer computer and the second customer computer are approved subscribers.

* * * * *